US006851113B2

(12) United States Patent
Hemsath

(10) Patent No.: US 6,851,113 B2
(45) Date of Patent: Feb. 1, 2005

(54) SECURE SHELL PROTOCOL ACCESS CONTROL

(75) Inventor: David Kurt Hemsath, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 09/895,120

(22) Filed: Jun. 29, 2001

(65) Prior Publication Data

US 2003/0005178 A1 Jan. 2, 2003

(51) Int. Cl.$^7$ .............................................. G06F 12/00
(52) U.S. Cl. ...................................... 718/104; 713/182
(58) Field of Search ..................... 718/104; 713/182, 713/200, 201; 709/302; 380/49

(56) References Cited

U.S. PATENT DOCUMENTS

| | | | | |
|---|---|---|---|---|
| 5,657,390 A | * | 8/1997 | Elgamal et al. | 713/151 |
| 5,867,665 A | | 2/1999 | Butman et al. | 709/223 |
| 5,867,667 A | | 2/1999 | Butman et al. | 709/225 |
| 5,870,562 A | | 2/1999 | Butman et al. | 709/229 |
| 5,884,035 A | | 3/1999 | Butman et al. | 709/218 |
| 5,991,876 A | | 11/1999 | Johnson et al. | 713/200 |
| 5,991,877 A | * | 11/1999 | Luckenbaugh | 713/200 |
| 6,026,430 A | | 2/2000 | Batman et al. | 713/201 |
| 6,064,977 A | | 5/2000 | Haverstock et al. | 705/9 |
| 6,101,607 A | * | 8/2000 | Bachand et al. | 713/201 |
| 6,115,744 A | | 9/2000 | Robins et al. | 709/227 |
| 6,119,230 A | | 9/2000 | Carter | 713/200 |
| 6,141,759 A | | 10/2000 | Braddy | 713/201 |
| 6,158,010 A | * | 12/2000 | Moriconi et al. | 713/201 |
| 6,163,844 A | | 12/2000 | Duncan et al. | 713/201 |
| 6,185,567 B1 | | 2/2001 | Ratnaraj et al. | 707/10 |
| 6,230,271 B1 | | 5/2001 | Wadlow et al. | 713/154 |
| 6,253,321 B1 | | 6/2001 | Nikander et al. | 710/168 |
| 2001/0005848 A1 | | 6/2001 | Haverstock et al. | |
| 2001/0007133 A1 | | 7/2001 | Moriconi et al. | |
| 2001/0013096 A1 | | 8/2001 | Luckenbaugh et al. | |

FOREIGN PATENT DOCUMENTS

JP          2001001198          4/2001

OTHER PUBLICATIONS

Ker beros & SSH: An Introduction; Oliver Thomas; Apr. 11, 2000.*
Inspec Abstract No. C2000–06–7210N–058, Dec. 1999.
Inspec Abstract No. C1999–09–6150N–027, Dec. 1998.

* cited by examiner

Primary Examiner—Meng-Al T. An
Assistant Examiner—Qing-Yuan Wu
(74) Attorney, Agent, or Firm—Robert H. Frantz; Jeffrey S. LaBaw

(57) ABSTRACT

An enhanced Secure Shell (SSH) protocol having fine-grained access security policy management and enforcement. Via an authorization application programming interface (aznAPI), remote user protocol connections and sessions may be added to the protected object space of a policy management system so that a system administrator may set permissions to access or use a particular secured system resource for each user, and by groups of users. Thus, when a user accesses the system by Secure Shell, rather than having full, unlimited use and access to system resources once authenticated, the user is granted permission to access only the system resources allowed in the security policy or policies.

22 Claims, 5 Drawing Sheets

SECURE SHELL PROTOCOL ACCESS CONTROL

BACKGROUND OF THE INVENTION

1. Field of the Invention

This invention relates to the arts of remote access to secure computer resources, and especially to the arts of remote secure administration of networked computer systems.

2. Description of the Related Art

Prior to the advent of the Secure Shell (SSH) protocol, specific UNIX system commands were available to be used by remote employees and users of networked computers, such as "rlogin" instead of "login". As such, there existed a collection of special versions of standard UNIX TCP/IP commands which could be executed remotely, whether it was Telnet, Login, or FTP, etc.

Subsequently, user authentification was added to these remote capabilities, as well as some level of encryption of the data communicated across an unsecured computer network between a remote user and a UNIX server. Authentication is the process of determining that a user attempting to remotely gain access to a system is actually the user he or she claims to be.

The SSH is a well-known program and a protocol for secure remote login and other secure network services over an unsecured network for UNIX-based networked computer systems. It has application in intranet environments, such as university computer systems, and it is anticipated that SSH will be more widely used for providing broadband, such as cable modems and xDSL, for Internet users to access to their systems and applications within their intranet environment.

Further, the growth in the number of corporate employees who "telecommute" part-time or full-time is a significant fraction of the global work force, today. SSH provides a nearly-transparent method of providing a secure connection to user applications.

As shown in FIG. 1, an SSH client (15) computer communicates to an SSH server (16) computer through an SSH protocol stack. The SSH client (15) and SSH Server (16) typically are based upon well-known computer platforms (17) such as personal computers or workstations, which each typically have a microprocessor, memory, an operating system, user input/output devices (keyboard, mouse, display, etc.), hard disk drives, and a network interface to a computer network (dial-up modem, local area network, etc.). In the case of SSH usage, the SSH server is typically provided with a UNIX-like operating system, such as IBM's AIX [TM], Hewlett-Packard's HP-UX [TM], or Linux.

There are many implementations of SSH available in the industry, some having minimal features, and others being more feature rich. In general, though, they all share the same stack structure in order to gain some level of compatibility with each other.

The SSH protocol stack consists of three major components. The Transport Layer Protocol (11) provides server authentication, confidentiality and integrity. In this "layer" of the stack, the two systems first negotiate which version of SSH will be used for communications (A), then a form or type of cryptography is selected which both client and server can support (B). If these steps are successful, a session key is established on the SSH Server (16). The Transport Layer (11) typically runs over a transmission control protocol/ Internet protocol ("TCP/IP") connection (10), but might also be used over any other reliable, connection-oriented data stream.

Next, the User Authentication Protocol (12) layers negotiate (D) an authentication model for use, followed by actual authentication (E) of the remote user's identity. Upon successful authentication completion, the User Authentication Protocol layer establishes a protected tunnel for the Connection Protocol to use. The User Authentication Protocol supports public key, password and host-based client authentication methods. However, these are just three instances of possible client authentication methods that are built on this protocol's authentication framework.

Third, the SSH Connection Protocol (13) then multiplexes the authenticated, protected tunnel into multiple logical channels for use by a plurality of application programs running on the SSH Server and SSH Client. The Connection Protocol (13) runs over the User Authentication Protocol (12), as shown in FIG. 1.

Above this entire stack may run the client-side application program or programs (14), such as Shell, Telnet, FTP, etc.

The programs implementing the SSH protocol are not standardized, but they are provided by various vendors and OpenSource providers. Typically, a SSH program is built on top of the SSH protocol. The SSH protocol is currently described by four Internet drafts from the Internet Engineering Task Force (IETF), including "SSH Protocol Architecture", "SSH Transport Layer Protocol", "SSH Authentication Protocol", and "SSH Connection Protocol".

The SSH Connection Protocol standards describe, but do not define, how the SSH Server side of this protocol must enforce whether or not to accept a client's request for a new logical channel over which to run an application program, such as Telnet.

Therefore, security policy management and enforcement is implemented differently by each SSH provider. Each implementation typically has its own management interface, semantics, etc. For example, some implementations of the server side of the SSH Connection protocol only provide a "binary policy," i.e. an authenticated user can request any number of logical channels and use all applications available through the SSH connection once the client has been authenticated. In such a situation, there is no application-specific or other criteria-specific access control provided. When a client has gained authorization, he or she effectively has access to all secured system resources.

This can be undesirable in many situations where it is desirable to grant access to a remote client to only a portion of the total secured system resources. Therefore, there is a need in the art for a robust policy management and enforcement service for the Secure Shell protocol which provides fine-grained, user-specific access to secured system resources.

BRIEF DESCRIPTION OF THE DRAWINGS

The following detailed description when taken in conjunction with the figures presented herein provide a complete disclosure of the invention.

SUMMARY OF THE INVENTION

The invention provides a fine-grained access security policy management and enforcement service for the well-known Secure Shell protocol by improving a SSH server protocol stack to include extensions to interface to an authorization service via an authorization application programming interface aznAPI. The enhanced SSH server protocol stack may interface to a standard, unmodified SSH client protocol stack, while providing improved authorization access according to a detailed security policy.

Following normal SSH transport layer negotiations, session key establishment, and user authentication layer operations, the SSH server stack creates a set of user credentials using an authorization service, and associates the credentials with the session key. Then, whenever a request for a new logical channel is received from the authenticated client, the server's SSH Connection layer determines whether or not to allow the logical channel based upon the results of a query to the authorization service. The authorization service maintains a policy database of allow users and permissions, preferably in a centralized location for ease of administration.

DETAILED DESCRIPTION OF THE INVENTION

The present invention is preferably implemented in conjunction with a suitable network security management server such as Tivoli's Policy Director [TM] product, running on a suitable operating system, such as HP-UX [TM], Solaris [TM], UNIX, or IBM's AIX [TM]. Any suitable networked computer server platform, such as a personal computer, may be employed in the invention.

It will, however, be recognized by those skilled in the art, that the authorization process disclosed herein may be realized individually, or as an improvement to other authorization processes on other server platforms. As such, the following detailed disclosure is given with respect to the preferred embodiment associated with the Policy Director [TM] product, which should not be viewed as a limitation or requirement of the present invention.

Further according to the preferred embodiment, an authorization service which is accessible via the Open Group Technical Standard Authorization API (aznAPI) is employed as the authorization service, although alternate proprietary or non-standard authorization services could be employed as well.

Figure 1:
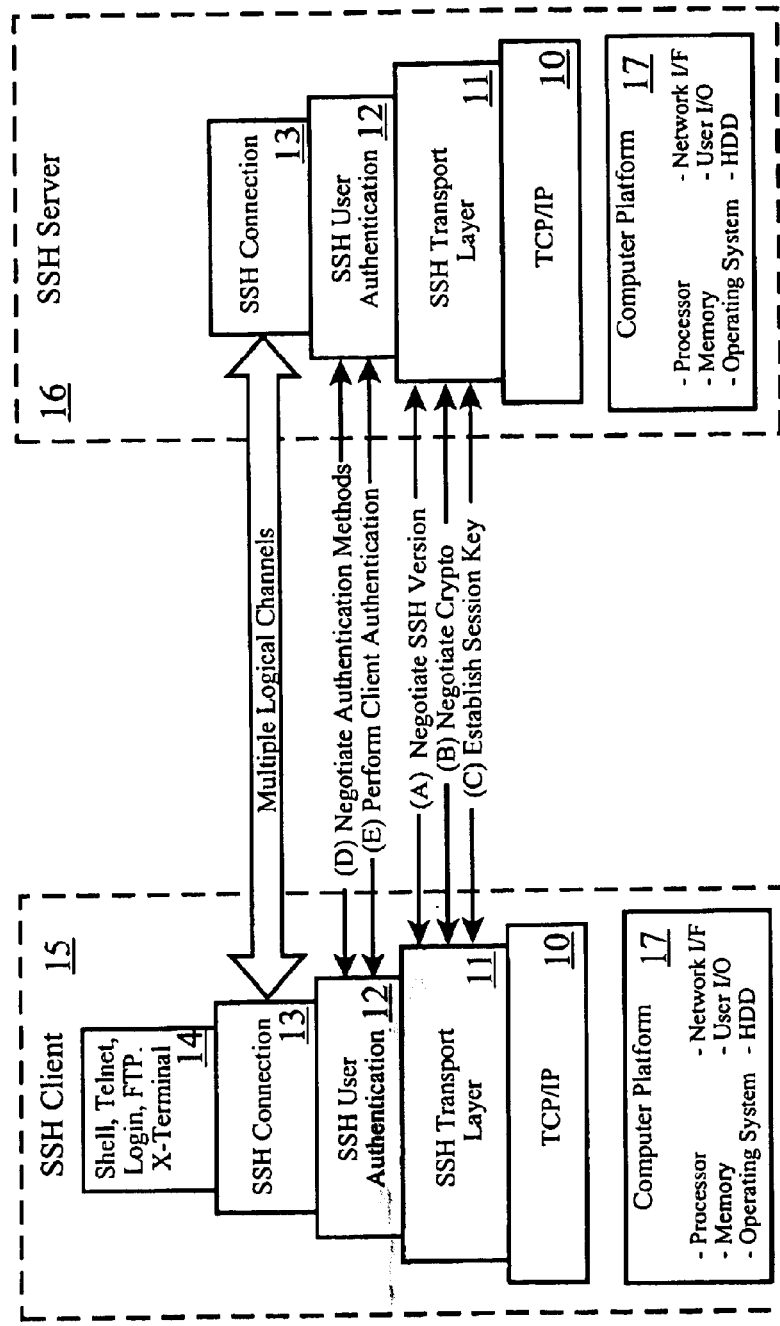
FIG. 1 illustrates the layered organization of the well-known Secure Shell protocol stack, interactions between the stack layers, and the process of authentication of a user.
Figure 2:
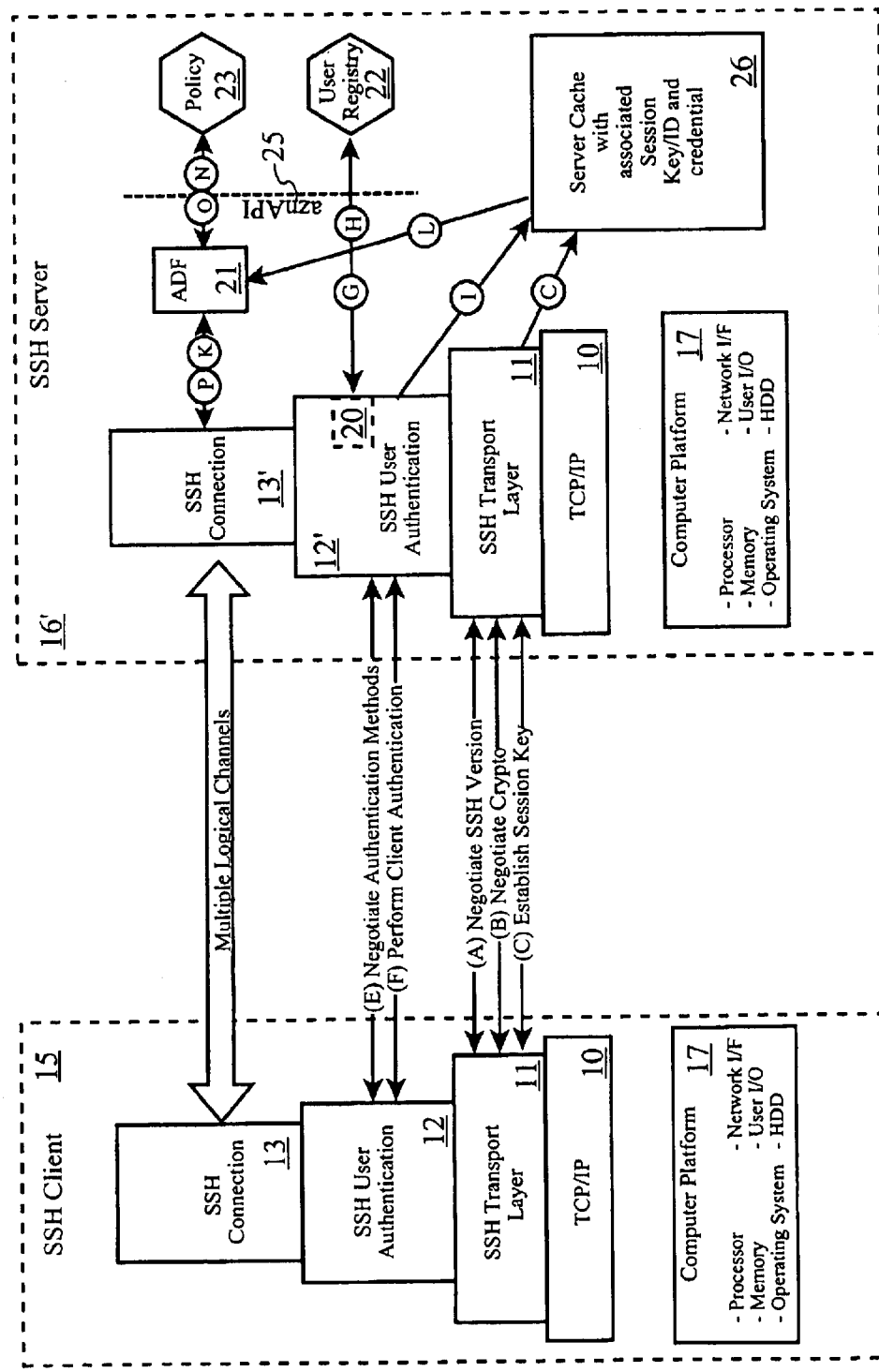
FIG. 2 sets forth details of the enhanced Secure Shell protocol stack.

Turning to FIG. 2, this invention is realized through two extensions to the existing SSH Protocol. The first extension is the addition of an aznAPI-based authentication method (20) to the SSH User Authentication Protocol (12') on the SSH Server (16'). The second extension is the provision of an aznAPI-based Access Decision Function (ADF) (21) in the server side of the SSH Connection (13') protocol.

One advantage of this method is that the SSH User Authentication protocol remains unchanged for the client side, which avoids the need to distribute new software to many client computers. All the changes to the standard SSH stack are made to the server-side software, where it is easily controlled and administered by a system administrator.

During session creation, many of the initial steps are unchanged from the well-known SSH process. First, the SSH transport layers (11) negotiate (A) a compatible SSH version to use, negotiate (B) a cryptography technology to use, and a session key is established and stored (C) in the server's cache (26).

Following the typical negotiation and cryptography selection steps (A, B, and C), the enhanced server-side SSH User Authentication service (12') negotiates (E) which authentication model to use, such as password or public key infrastructure (PKI), and normal user authentication is completed (F).

Figure 3:
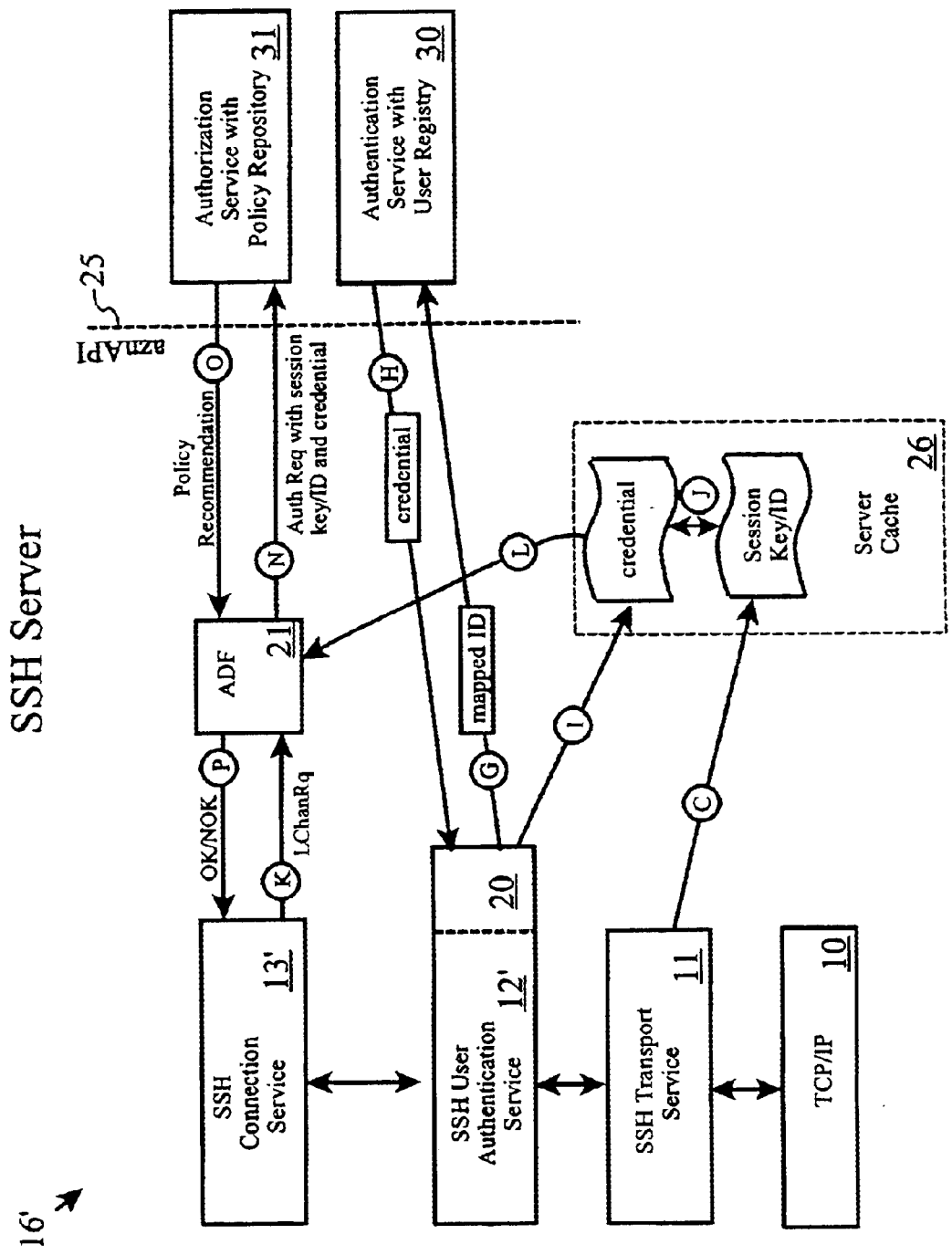
FIG. 3 illustrates the data flow between processes of the Secure Shell server according to the preferred embodiment.

Turning to FIG. 3, the data flow relationships between the enhanced server-side SSH processes are shown in more detail. Rather than immediately allowing the SSH connection layers to proceed with establishing multiplexed logical channels into the secured tunnel, the enhanced server-side SSH User Authentication service (12') maps the user's identity (e.g., username, domain name, host name, etc.) to a canonical identity useful for submitting to the authorization service via the aznAPI (25). This mapped ID is submitted (G) to an Authentication Service (30), preferably via the standard aznAPI, which checks it against a user registry (22). The Authorization Service (30) returns (H) a credential binding the client's identity to a set of privileges.

According to the preferred embodiment, the user registry (22) is preferably the same one used for all aznAPI applications on the server, although there could be many more than just the SSH extensions, and thus represents another improvement over typical SSH implementations by consolidating SSH users into a single, centralized user registry.

Next, the credential is cached (I) by the enhanced SSH User Authentication service (12') where it is associated (J) with the session key/identity established earlier by the SSH Transport service (11).

Subsequently, when an application program or a user of the SSH client requests a new logical channel to be established, the enhanced server SSH Connection service (13') posts (K) a logical channel request including the session key/ID to the new Authorization Decision Function (ADF) (21).

The ADF (21) uses the session key/ID to retrieve (L) the associated credential from cache (26), and submits them in a action request to an Authorization Service (13), preferably via the aznAPI (25).

The Authorization Service (31) evaluates the action request and credentials in view of a security policy database containing a list of allowed or permitted actions for each user and user group, and returns a recommendation (O) for approval or rejection of the request. In turn, the ADF (21) provides the SSH Connection service (13') with an "OK" or "Not OK" response.

Finally, if the logical channel is approved, the SSH Connection layer (13') creates or allocates the new channel, otherwise, the channel is not created.

Figure 4:
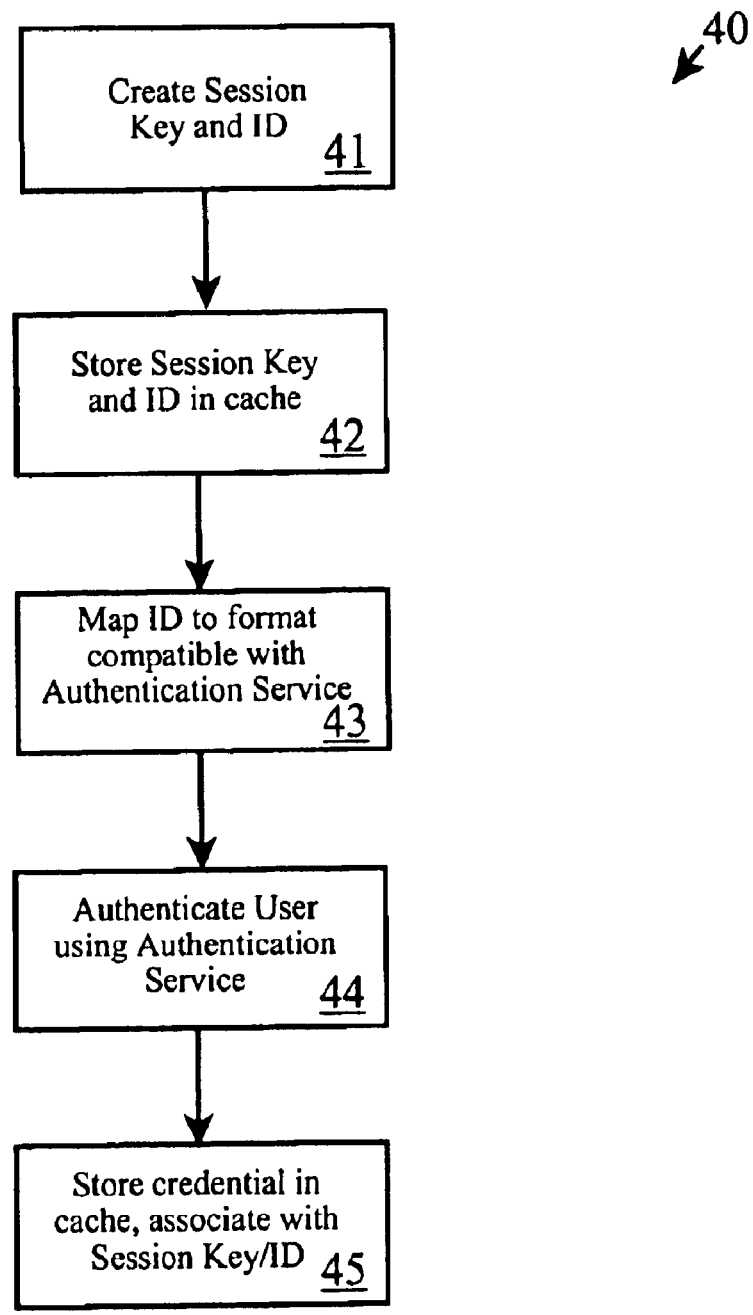
FIG. 4 discloses the logical process of creating an associated set of user credentials and session key/ID.

Turning to FIG. 4, the logical process of establishing the user credential is shown in detail. First, a session key/ID is created (41) and stored (42) in server cache or memory. The user ID is then mapped (43) to a format compatible with the Authentication Service employed, and a set of credentials are created (44) by an Authorization Service. Finally, the credentials are stored in server cache and associated (45) with the session key/ID.

Figure 5:
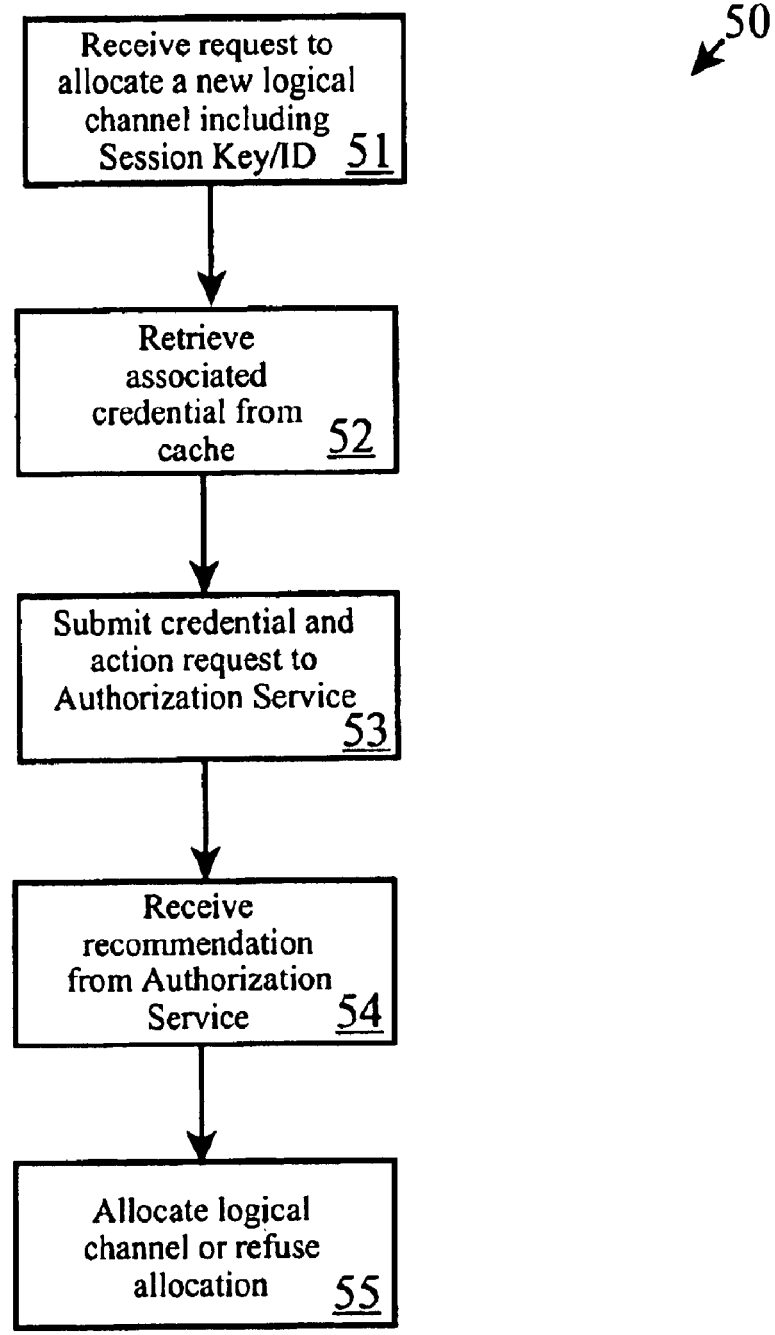
FIG. 5 discloses the logical process of determining whether or not to allocate a new logical channel based upon fine-grained access security policy.

FIG. 5 shows the logical process of determining whether or not to approve a request for allocation of a new logical channel based on a fine-grained access security policy. When a request for a new logical channel is received (51) from a client, the session key/ID is used to retrieve (52) the associated credential from server memory or cache. Then, the credential is passed (53) to an Authorization Service, preferably via the aznAPI. The Authorization Service consults the security policy repository, and a recommendation

(54) is made to approve or disapprove the request for a new logical channel. Then, the logical channel is either established or disallowed (55).

According to the preferred embodiment, the Authorization Service and Authentication Service employed to realize the invention are those services of the aforementioned Policy Director [TM]. However, alternate authorization and authentication service products could be employed.

The policy management function of the preferred embodiment allows for each protected object, such as a particular server application program or resource, to have an entry in an Access Control List (ACL) in the policy database. Many policy management systems have similar capabilities, and access control lists are well-known in the art.

Each entry in an ACL is attached to a protected object. For example, an ACL entry such as:

user b_smith - - - r - - - C might indicate that the user having user ID of "b_smith" is permitted to read a particular system file, as indicated by the permission "r". Also, the permission "C" might indicate that the user has the privilege to connect to a particular application program. An ACL may be kept in individual data objects, text files, or database records, depending on the implementation of the policy management system. Through these mechanisms, the policy management system can evaluate specific requests for specific actions to specific protected objects, thus allowing for "fine-grained" access control of the protected objects.

As the preferred embodiment uses the open aznAPI to interface to a policy management system, it is of little consequence exactly how the policy management system stores ACL, but is only important that it support the API and provide the fine-grained access control in order to meet the objectives of the present invention.

As such, this invention provides a standards-based and standards-compatible method for SSH implementors to provide fine-grained application-level and channel-level access control, while concurrently enabling SSH to be managed as part of a larger set of aznAPI-based applications within the protected object space of a networked server system.

The foregoing description has been set forth with particular details relating to the preferred embodiment. It will be recognized by those skilled in the art that many departures from the disclosed preferred embodiment, such as implementation of the method as a "stand alone" process, or inclusion of the method with alternate server software, operating systems or computing platforms, may be made without departing from the spirit and scope of the invention. Therefore, the scope of the present invention should be determined by the following claims.

What is claimed is:

1. A method of providing fine-grained access for remote clients to secured resources of a computer system, said computer system having an user registry and an access control policy repository, said method comprising the steps of:

suspending the establishment of a logical channel during Secure Shell session creation;

mapping a user's identity to an identity compatible with an Authorization Service and Access Control Policy Repository;

submitting said mapped identity to said Authentication Service;

receiving at least one credential from said Authentication Service, said credential binding said mapped identity to a set of fine-grained privileges;

catching and associating said credentials with said session key; and performing a security policy approval responsive to a Secured Shell logical channel allocation request, said approval considering permissions set in said access control policy repository in comparison to said cached session key, ID and associated credentials.

2. The method as set forth in claim 1 wherein said step of caching a said credential is performed by a user authentication service of a Secured Shell communications protocol stack.

3. The method as set forth in claim 1 wherein said step of associating said credentials with said cached session key and ID is performed from a user authentication layer of a Secure Shell communications protocol stack.

4. The method as set forth in claim 1 wherein said step of performing a security policy approval is performed from a connection layer of a Secured Shell protocol stack.

5. The method as set forth in claim 1 wherein said step of generating a set of user credentials binding user ID to a set of privileges is preformed via an Authorization Application Programming Interface.

6. The method as set forth in claim 1 wherein said step of performing a security policy approval is performed via an Authorization Application Programming Interface.

7. A computer readable medium encoded with software for providing fine-grained access for remote clients to secured resources of a computer system, said computer system having a user registry and an access control policy repository, said software when executed causing the computer system to preform the steps of:

suspending the establishment of a logical channel during a Secure Shell session creation;

mapping a user's identity to an identity compatible with an Authorization Service and Access Control Policy Repository;

submitting said mapped identity to said Authentication Service;

receiving at least one credential from said Authentication Service, said credential binding said mapped identity to a set of fine-grained privileges;

caching and associating said credentials with said session key; and performing a security policy approval responsive to a Secure Shell logical channel allocation request, said approval considering permissions set in said access control policy repository in comparison to said cached session key, ID and associated credentials.

8. The computer readable medium as set forth in claim 7 wherein said software for caching a session key and ID is executable from a transport layer of a Secured Shell communications protocol stack.

9. The computer readable medium as set forth in claim 7 wherein said software for associating said credentials with said cached session key and ID is executable from a user authentication layer of a Secure Shell communications protocol stack.

10. The computer readable medium as set forth in claim 7 wherein said software for performing a security policy approval is executable from a connection layer of a Secure Shell communications protocol stack.

11. The computer readable medium as set forth in claim 7 wherein said software for generating a set of user credentials which bind a user ID to a set of privileges is executable via an Authorization Application Programming Interface.

12. The computer readable medium as set forth in claim 7 wherein said software for performing a security policy approval is executable via an Authorization Application Programming Interface.

13. A system for providing fine-grained access for remote clients to secured resources of a computer, said computer having a user registry an access control policy repository, said system comprising:
   a logical channel control configured to suspend the establishment of a logical during Secure Shell session creation;
   an ID mapper adapted to map a user's identity to an identity compatible with an Authorization Service and Access Control Policy Repository;
   a session key and a mapped user ID in a cache;
   at least one credential bound to said mapped user ID and to said session key, said credentials including a set of fine-grained resource permissions set; and
   a security policy approval service which, responsive to a Secure Shell logical channel allocation request adapted to consider said permissions set prior to allowing allocation of said logical channel.

14. The system as set forth in claim 13 wherein said session key and ID are modifiable from transport layer of a Secure Shell communications protocol stack.

15. The system as set forth in claim 13 wherein said credential association with a session key and mapped ID is adapted to be created by a user authentication layer of a Secure Shell communications protocol stack.

16. The system as set forth in claim 13 wherein said security policy approval service is accessible from a connection layer of a Secured Shell communications protocol stack.

17. The system as set forth in claim 13 wherein said credentials comprise a credentials created via an Authorization Application Programming Interface.

18. The system as set forth in claim 13 wherein said security policy approval service is accessible via an Authorization Application Programming Interface.

19. A protocol stack communications system for a computer system, said computer system having a user registry and an access control policy repository, said communications system comprising:
   a logical channel control configured to prohibit establishment of a logical channel during Secure Shell session creation;
   an ID mapper adapted to map a user's identity to an identity compatible with an Authorization Service and Access Control Policy Repository;
   a session key and a mapped user ID stored in a computer cache;
   a credential associated with said cached session key and said mapped user ID said credentials including a set of fine-grained resource permissions set; and
   a security policy approval service which, responsive to a Secure Shell logical channel allocation adapted to consider said permissions set prior to allowing or disallowing allocation of said logical channel
   a security policy approval service adapted to consider said permissions set prior to allowing or disallowing allocation of said logical channel.

20. The communications system as set forth in claim 19 further comprising a transport layer service which is adapted to create and deposit said session key and ID into computer cache.

21. The communications system as set forth in claim 19 further comprising a user authentication layer service which is adapted to obtain a credential from an authentication service, and to associate said credential with said cached session key and mapped user ID.

22. The communications system as set forth in claim 19 further comprising a connection layer service adapted to obtain an policy approval decision from an authorization service.

* * * * *